US011970003B2

(12) United States Patent
Hirose et al.

(10) Patent No.: US 11,970,003 B2
(45) Date of Patent: Apr. 30, 2024

(54) LIQUID EJECTION APPARATUS, LIQUID EJECTION METHOD, DISPENSING APPARATUS, AND COMPOUND INTRODUCTION APPARATUS

(71) Applicant: CANON KABUSHIKI KAISHA, Tokyo (JP)

(72) Inventors: Futoshi Hirose, Kanagawa (JP); Shinichi Sakurada, Tokyo (JP); Sachiko Yamauchi, Kanagawa (JP); Tatsuaki Orihara, Tokyo (JP); Yoshinori Itoh, Kanagawa (JP); Nobuyuki Kuwabara, Tokyo (JP); Tsutomu Shiratori, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 29 days.

(21) Appl. No.: 17/693,854

(22) Filed: Mar. 14, 2022

(65) Prior Publication Data

US 2022/0297429 A1 Sep. 22, 2022

(30) Foreign Application Priority Data

Mar. 18, 2021 (JP) ................................. 2021-044708
Mar. 10, 2022 (JP) ................................. 2022-037162

(51) Int. Cl.
*B41J 2/14* (2006.01)
*B41J 2/16* (2006.01)

(52) U.S. Cl.
CPC ........... *B41J 2/1433* (2013.01); *B41J 2/1631* (2013.01); *B41J 2002/14491* (2013.01); *B41J 2202/11* (2013.01)

(58) Field of Classification Search
CPC .............................. B41J 2/1433; B41J 2/1631
See application file for complete search history.

(56) References Cited

U.S. PATENT DOCUMENTS

| | | | |
|---|---|---|---|
| 7,867,450 B2 | 1/2011 | Hanaoka et al. | |
| 9,045,757 B2 | 6/2015 | Xu et al. | |
| 9,598,704 B2 | 3/2017 | Xu et al. | |
| 2005/0140718 A1* | 6/2005 | Usuda .................. | B41J 2/16508 347/29 |

FOREIGN PATENT DOCUMENTS

| | | | | |
|---|---|---|---|---|
| JP | 4910727 B2 | 4/2012 | | |
| JP | 5645657 B2 | 12/2014 | | |
| JP | 2020092692 A * | 6/2020 | ............ | B01L 3/0268 |
| WO | 2008/153968 A2 | 12/2008 | | |

OTHER PUBLICATIONS

Itoh et al., U.S. Appl. No. 17/693,829, filed Mar. 14, 2022.
Sakurada et al., U.S. Appl. No. 17/693,836, filed Mar. 14, 2022.
Yamauchi et al., U.S. Appl. No. 17/693,844, filed Mar. 14, 2022.

* cited by examiner

*Primary Examiner* — Jason S Uhlenhake
(74) *Attorney, Agent, or Firm* — Venable LLP

(57) ABSTRACT

Provided is a liquid ejection apparatus, liquid ejection method, dispensing apparatus, and compound introduction apparatus capable of inhibiting contamination of a liquid after being ejected. The liquid ejection apparatus has an ejection unit having an ejection part and an ejection energy generation element that ejects a liquid from the ejection part by using a principle of inkjet ejection into an internal space in a storage part capable of storing the ejected liquid. When ejecting the liquid, the ejection unit covers an opening portion of the storage part to thereby screen the internal space in the storage part from an external space.

10 Claims, 8 Drawing Sheets

LIQUID EJECTION APPARATUS, LIQUID EJECTION METHOD, DISPENSING APPARATUS, AND COMPOUND INTRODUCTION APPARATUS

BACKGROUND OF THE INVENTION

Field of the Invention

The present invention relates to a liquid ejection apparatus, a liquid ejection method, dispensing apparatus, and compound introduction apparatus for ejecting a liquid with the action of an ejection energy generation element.

Description of the Related Art

Japanese Patent No. 4910727 discloses a technique for dispensing a liquid such as a sample or a specimen by using the principle of inkjet using an ejection energy generation element. Also, Japanese Patent No. 5645657 discloses a technique for introducing a compound into cells by using the principle of inkjet using an ejection energy generation element. In such techniques, the liquid, such as a sample, a specimen, or a cell suspension, after being ejected needs be prevented from being chemically and biologically contaminated.

Here, a liquid ejection mechanism using the principle of inkjet ejection generates mist originating from a liquid when it is ejected. Aerosol including such mist may float and get attached to the interior of the apparatus, and consequently contaminate the ejected liquid. In Japanese Patent No. 4910727, a cartridge that ejects a liquid is replaceable but there is no mention about other features of the configuration, and the technique disclosed in Japanese Patent No. 4910727 cannot handle the aerosol. Also, in Japanese Patent No. 5645657, a technique for inhibiting contamination is not mentioned.

SUMMARY OF THE INVENTION

The present invention has been made in view of the above problem and provides a liquid ejection apparatus, liquid ejection method, dispensing apparatus, and compound introduction apparatus capable of inhibiting contamination of a liquid after being ejected.

In the first aspect of the present invention, there is provided a liquid ejection apparatus including:

- an ejection unit having an ejection part and an ejection energy generation element that ejects a liquid from the ejection part by using a principle of inkjet ejection into an internal space in a storage part capable of storing the ejected liquid,
- wherein when ejecting the liquid, the ejection unit covers an opening portion of the storage part to thereby screen the internal space in the storage part from an external space.

In the second aspect of the present invention, there is provided a liquid ejection method for a liquid ejection apparatus including an ejection unit having an ejection part and an ejection energy generation element that ejects a liquid from the ejection part by using a principle of inkjet ejection into an internal space in a storage part capable of storing the ejected liquid, the method including

- when ejecting the liquid, covering an opening portion of the storage part to thereby screen the internal space in the storage part from an external space.

In the third aspect of the present invention, there is provided a dispensing apparatus including:

- a stage on which to dispose a container including a plurality of storage parts capable of storing a liquid;
- an ejection unit configured to be replaceable, filled with the liquid, and having an ejection part and an ejection energy generation element that ejects the liquid from the ejection part by using a principle of inkjet ejection; and
- a movement unit configured to move the stage and the ejection unit relative to each other,
- wherein the liquid is dispensed into each of the storage parts by ejecting the liquid into an internal space in the storage part from the ejection unit moved to an opening portion of the storage part by the movement unit, and
- wherein the ejection unit includes a screen that, when the ejection unit ejects the liquid to each of the storage parts, covers the opening portions of all of the storage parts to thereby screen the internal spaces in all of the storage parts from an external space in such a state that the liquid is electable to the storage part to which the liquid is to be ejected.

In the fourth aspect of the present invention, there is provided a compound introduction apparatus including

- an ejection unit configured to be replaceable, filled with a cell suspension containing a compound and a cell into which the compound is to be introduced, and having an ejection part and an ejection energy generation element that ejects the cell suspension from the ejection part by using a principle of inkjet ejection into an internal space in a storage part provided in a container and capable of storing the ejected cell suspension,
- wherein the cell suspension is ejected from the ejection unit to thereby introduce the compound into the cell, and
- wherein the ejection unit includes a tight contact portion that comes into tight contact with the container to thereby screen the internal space in the storage part from an external space.

According to the present invention, it is possible to provide a liquid ejection apparatus, liquid ejection method, dispensing apparatus, and compound introduction apparatus capable of inhibiting contamination of a liquid after being ejected.

Further features of the present invention will become apparent from the following description of exemplary embodiments with reference to the attached drawings.

DESCRIPTION OF THE EMBODIMENTS

Exemplary embodiments of a liquid ejection apparatus, liquid ejection method, dispensing apparatus, and compound introduction apparatus will be described in detail below with reference to the accompanying drawings. Note that the following embodiments do not limit the present invention, and not all the combinations of the features described in the embodiments are necessarily essential for the solution to be provided by the present invention. Moreover, the relative positions, shapes, and the like of the components described in the embodiments are mere examples, and the scope of the present invention is not limited only to these.

First Embodiment

Figure 1:
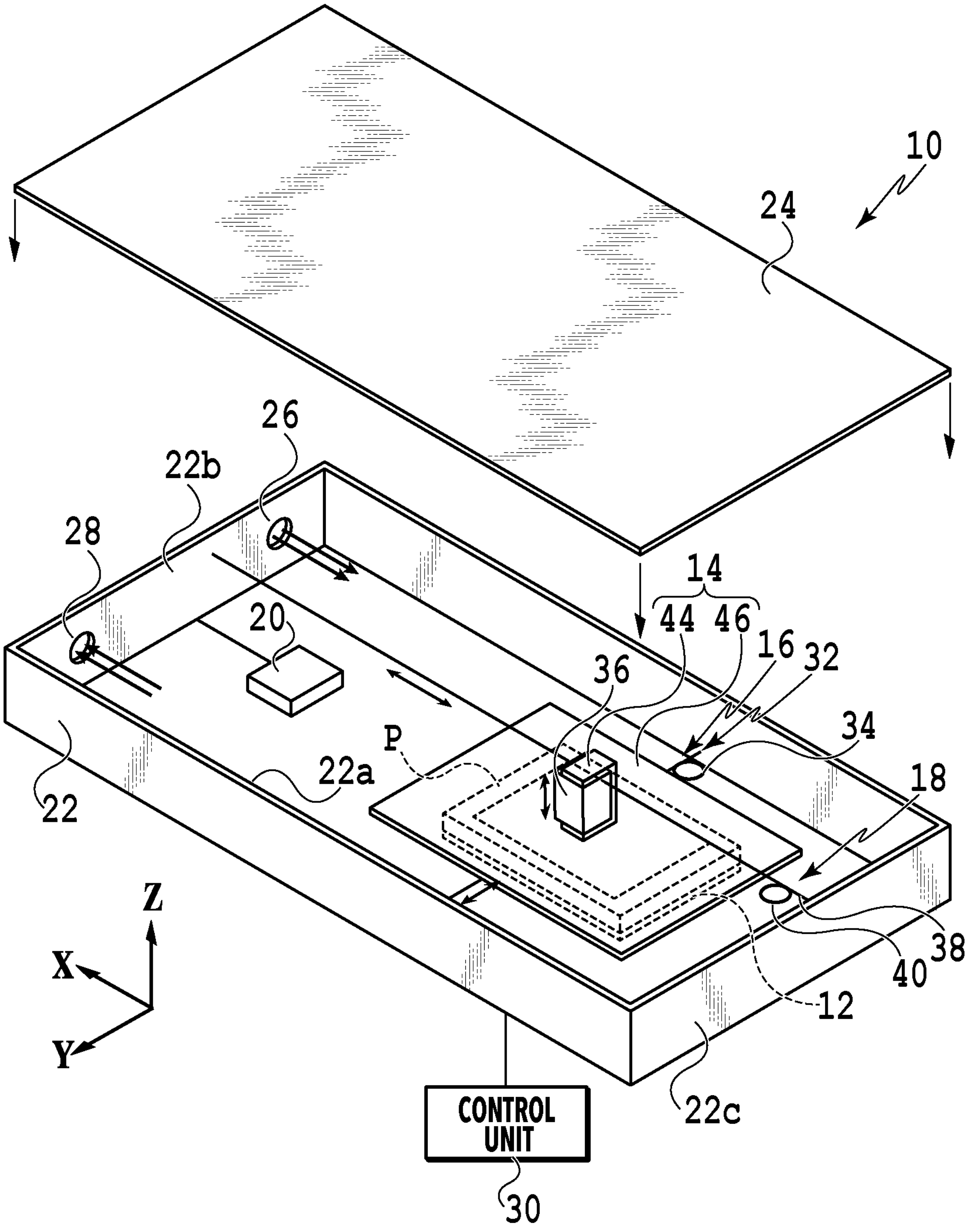
FIG. 1 is a schematic configuration diagram of a dispensing apparatus.

First, a liquid ejection apparatus according to a first embodiment will be described with reference to FIGS. 1 to 5. FIG. 1 is a schematic configuration diagram of the liquid ejection apparatus according to the first embodiment. The liquid ejection apparatus according to the present embodiment is a dispensing apparatus capable of dispensing a liquid such as a sample or a specimen into a plurality of wells provided in a plate by using the principle of inkjet ejection. Note that, in FIG. 1, the region in the plate where the plurality of wells are formed is simplified and illustrated as a rectangular region.

<Configuration of Dispensing Apparatus>

A dispensing apparatus 10 includes a stage 12 on which to dispose a plate P onto which a liquid such as a sample or a specimen is to be ejected, and a liquid ejection head unit (referred to simply as "head unit" as appropriate) 14 that ejects this liquid onto the plate P. In the present embodiment, the liquid such as a sample or a specimen to be ejected from the head unit 14 and dispensed onto the plate P will be referred to simply as "sample" as appropriate. The dispensing apparatus 10 also includes a stage movement unit 16 capable of moving the stage 12 in a Y direction, and a head movement unit 18 capable of moving the head unit 14 in an X direction crossing (in the present embodiment, perpendicularly crossing) the Y direction. The dispensing apparatus 10 further includes a suction unit 20 that sucks the sample filled in the head unit 14 from an ejection part 48 (described later) of the head unit 14.

The above components of the dispensing apparatus 10 are disposed inside a body part 22 of a substantially box shape opening at the top. Moreover, while the dispensing apparatus 10 is used, an opening portion 22*a* of the body part 22 is covered with a lid part 24. In a side surface 22*b* of the body part 22, there are formed an air suction port 26 through which to suck in external air and an air discharge port 28 through which to discharge internal air to the outside. That is, the dispensing apparatus 10 has its component members such as the stage 12 and the head unit 14 disposed inside a housing formed of the body part 22 and the lid part 24, and the air suction port 26 and the air discharge port 28 are formed in this housing.

In the present embodiment, the air suction port 26 and the air discharge port 28 are formed in the side surface 22*b*, but the present embodiment is not limited to this configuration. The air suction port 26 may be formed in the side surface 22*b*, and the air discharge port 28 may be formed in a side surface 22*c* facing the side surface 22*b*. In this case, it is preferable to form the air suction port 26 on one end side in the Y direction and form the air discharge port 28 on the other end side in the Y direction.

Figure 2A:
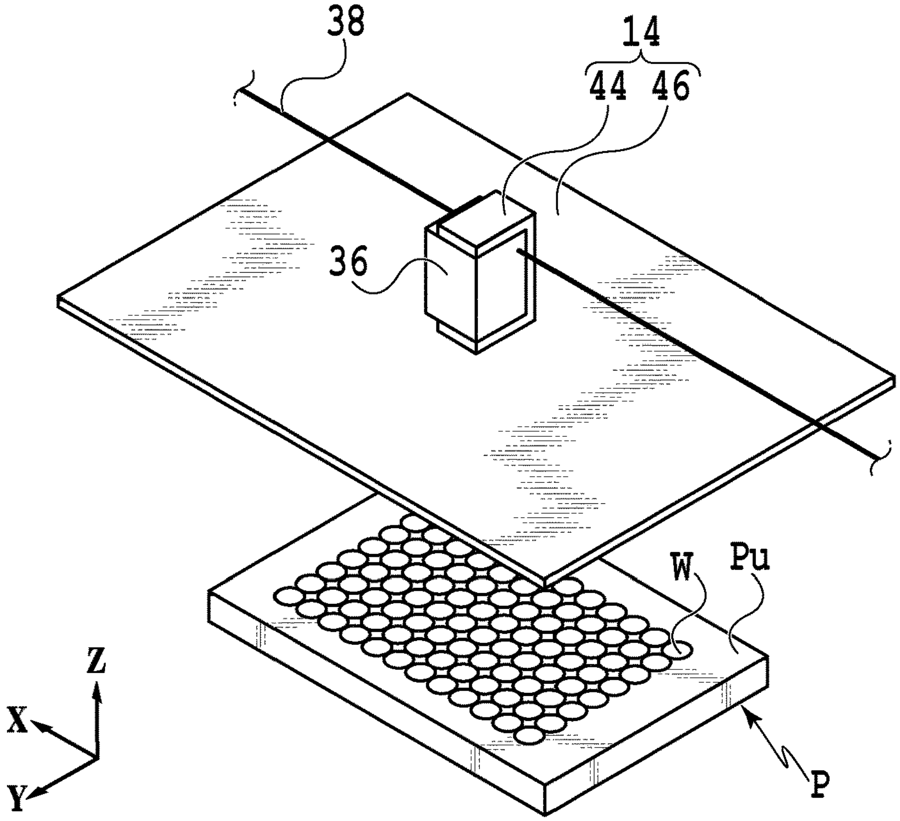
FIGS. 2A and 2B are schematic configuration diagrams of a liquid ejection head unit.

The operation of the entire dispensing apparatus 10 is controlled by a control unit 30. An information terminal, such as a general-purpose personal computer, is connected to the dispensing apparatus 10, and various instructions, information, and the like are input from this information terminal into the control unit 30 via interfaces. In the present embodiment, the plate P is, for example, a culture plate and includes a plurality of wells W. In FIG. 2A, a plate including 96 wells W is illustrated. In other words, the plate P is a container in which are formed storage parts capable of storing the liquid ejected from the head unit 14. Moreover, in the present embodiment, the dispensing apparatus 10 dispenses the sample to be ejected from the head unit 14 in a predetermined amount into each well W in the plate P. The plate P to be disposed on the stage 12 is not limited to a culture plate with the above specifications, and may be a culture plate with other specifications or a culture dish. The stage 12 may include, for example, a component that fixes the plate P disposed thereon.

The stage movement unit 16 includes a belt 32 that is connected to the stage 12, and a driving unit 34 that drives the belt 32. The stage movement unit 16 is configured to be capable of reciprocating the stage 12 in the Y direction via the belt 32 by the driving of the driving unit 34. Note that the driving of the driving unit 34 is controlled by the control unit 30. Thus, the stage movement unit 16 can move the stage 12 to any position in the Y direction by controlling the driving of the driving unit 34 with the control unit 30.

The head movement unit 18 includes a belt 38 connected to a holder 36 that holds the head unit 14, and a driving unit 40 that drives the belt 38. The head movement unit 18 is configured to be capable of reciprocating the head unit 14 held by the holder 36 in the X direction via the belt 38 by the driving of the driving unit 40. Note that the driving of the driving unit 40 is controlled by the control unit 30. Thus, the head movement unit 18 can move the head unit 14 to any position in the X direction by controlling the driving of the driving unit 40 with the control unit 30. Also, the head movement unit 18 is configured to be capable of raising and lowering the holder 36 in a Z direction by the driving of a driving unit (not illustrated), The driving of this driving unit is controlled by the control unit 30.

As described above, in the present embodiment, the stage movement unit 16 and the head movement unit 18 function as moving units configured to move the stage 12 and the head unit 14 relative to each other. Note that, in the present embodiment, the stage 12 is configured to be movable in the Y direction and the head unit 14 is configured to be movable in the X and Z directions, but the present embodiment is not limited to this configuration. Any configuration can be employed as long as the stage 12 and the head unit 14 can be moved relative to each other in the X, Y, and Z directions. One of the stage 12 or the head unit 14 may be fixedly provided.

In the head unit 14, the ejection part 48 for ejecting the sample is formed, and the suction unit 20 forcibly sucks in the sample filled in the head unit 14 through the ejection part 48. By executing such a suction process with the suction unit 20 on the head unit 14 which is yet to eject the sample, the sample is filled into the ejection part 48. A waste liquid tube 42 is connected to the suction unit 20, and the sample sucked out by the suction unit 20 is discharged to the outside of the apparatus through the waste liquid tube 42.

The air suction port 26 includes a fan 88 (see FIG. 4) and a filter (not illustrated). The driving of the fan 88 is controlled by the control unit 30. Thus, at the air suction port 26, while the dispensing apparatus 10 is in operation, the fan 88 is driven by the driving of the control unit 30, so that external air is sucked into the apparatus through the filter. Also, as air is sucked into the apparatus from the air suction port 26, air inside the apparatus is discharged from the air discharge port 28. In this way, it is possible to discharge mist generated at the time of ejecting the sample to the outside of the apparatus while also inhibiting entry of dust such as dirt into the apparatus. Note that, for the mechanism for sucking air in through the air suction port 26, any of various publicly known techniques can be employed as long as the configuration is such that air not containing dust or the like can be supplied into the dispensing apparatus 10 from the air suction port 26.

<Configuration of Head Unit>

Figure 2B:
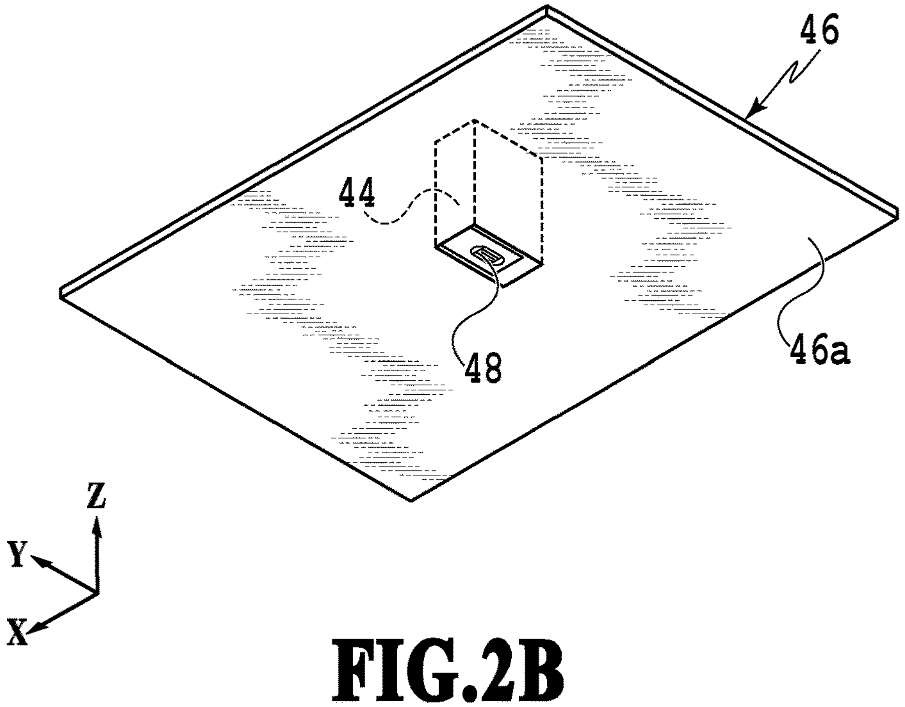

Next, the head unit 14 will be described in detail with reference to FIGS. 2A and 2B. FIG. 2A is a top perspective view of the head unit 14, and FIG. 2B is a bottom perspective view of the head unit 14. Note that, in FIG. 2A, the head unit 14 and the plate P are illustrated to be separated from each other in the Z direction in order to facilitate understanding. In the present embodiment, the gap between the head unit 14 and the plate P when the sample is ejected, i.e., dispensed into the wells W is set to be a predetermined value of 0.1 mm or more and 1.0 mm or less.

The head unit 14 is replaceably supported by the holder 36 of the head movement unit 18. The head unit 14 includes a liquid ejection head (referred to simply as "head" as appropriate) 44 that ejects the sample by utilizing the principle of inkjet ejection. The head unit 14 also includes a screen 46 that covers the opening portion of each well W in the plate P disposed on the stage 12 to thereby screen the internal space in the well W from the external space (the space inside the apparatus).

The head 44 includes the ejection part (referred to also called "ejection ports") 48 for ejecting the sample (see FIG. 2B). This head 44 is connected to the control unit 30, for example, through a cable installed with the belt 38, and its driving is controlled by the control unit 30. A specific configuration of the head 44 will be described later.

The screen 46 has a plate shape and is fixedly formed on the head 44. The screen 46 may be bonded to the head 44 formed as a separate body or formed integrally with the head 44. A back surface (a surface facing the plate P) 46*a* of the screen 46 is formed flat. Also, the screen 46 has such a size that it can cover the opening portions of all wells W to thereby screen the internal spaces in the wells W from the space inside the apparatus regardless of which well W in the plate P the sample is to be ejected into.

Note that a sample ejection surface 48*a* (see FIG. 3B) of the ejection part 48 is exposed at the back surface 46*a* of the screen 46, and the back surface 46*a* and the ejection surface 48*a* are formed to be coplanar with each other. In this way, the head unit 14 and the plate P can be effectively brought close to each other during a dispensing operation. Thus, the head unit 14 covers the opening portions of all wells W with the screen 46 in such a state that the sample is electable into an ejection-target well W.

Figure 3A:
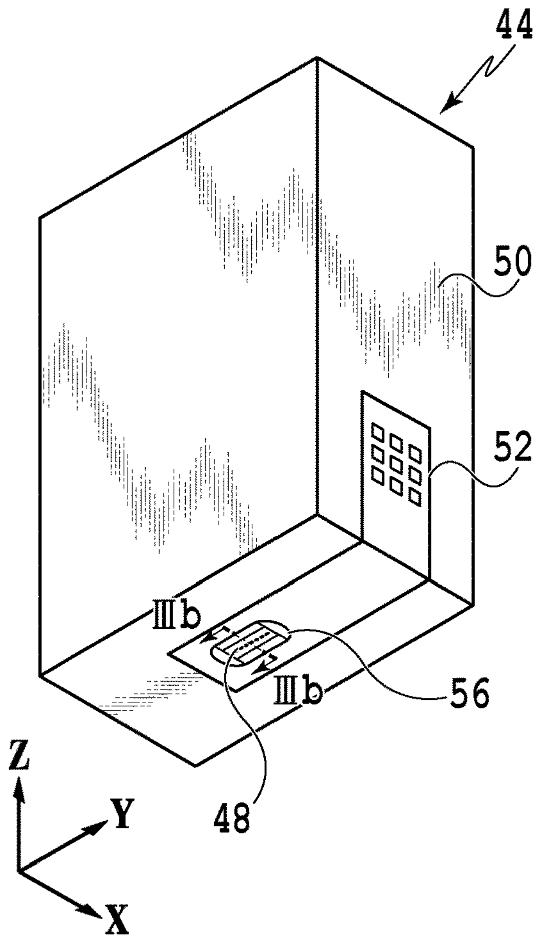
FIGS. 3A to 3D are diagrams explaining configurations of a liquid ejection head and an ejection part.
Figure 3B:
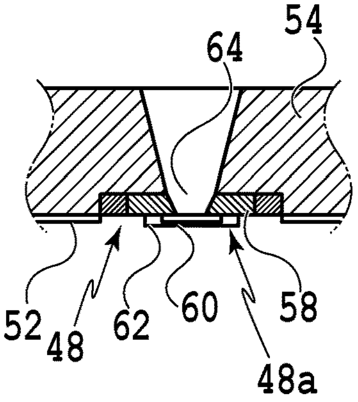
Figure 3C:
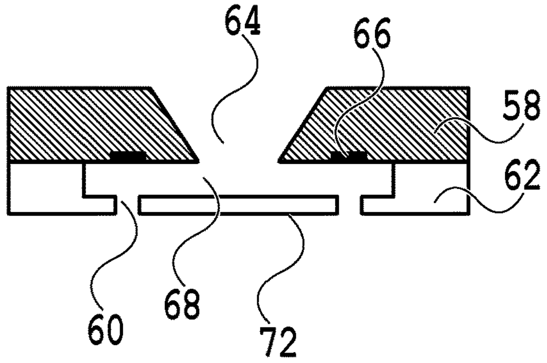
Figure 3D:
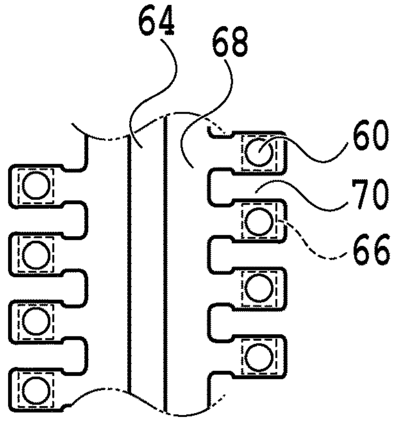

FIGS. 3A to 3D are diagrams illustrating a specific configuration of the ejection part 48 of the head 44. FIG. 3A is a perspective configuration diagram of the head 44. FIG. 3B is a cross-sectional view along line in FIG. 3A. FIG. 3C is an enlarged view of the main part of FIG. 3B. FIG. 3D is a view illustrating a configuration of nozzles in the ejection part.

The head 44 includes a tank part 50 filled with the sample to be ejected, the ejection part 48 of a chip shape provided integrally with the tank part 50, and an electrical wiring member 52 to be electrically connected to an external entity (see FIG. 3A). The ejection part 48 is connected to the electrical wiring member 52 and ejects the sample held in the tank part 50 in response to a voltage applied thereto from the electrical wiring member 52.

The electrical wiring member 52 is a member for forming electrical signal channels for supplying electrical signals to electrode wirings of the ejection part 48. In the electrical wiring member 52, an opening portion for installing the ejection part 48 is formed. Electrode terminals (not illustrated) to be connected to electrode portions of the ejection part 48 are formed near the edge of this opening portion. The ejection part 48 and the electrical wiring member 52 are connected to a liquid supply-hold part 54 formed by molding a resin. The electrical connection between the ejection part 48 and the electrical wiring member 52 is sealed by a sealant 56, so that the electrical connection is protected from corrosion by the sample to be ejected and external impact.

The ejection part 48 includes a silicon (Si) substrate 58 and a plate 62 in which nozzle ports 60 for ejecting the sample are formed (see FIGS. 3B and 3C). In the substrate 58, a liquid supply port 64 is formed which receives the sample supplied from the tank part 50 through the liquid supply-hold part 54 and supplies the sample to the nozzle ports 60 in the plate 62. Also, the substrate 58 is provided with heating elements (electrothermal transducers) 66 at positions corresponding to the nozzle ports 60. The liquid supply port 64 is formed to extend over the entire length of each array (described next) of nozzle ports 60.

In the plate 62, the nozzle ports 60 are arrayed at predetermined intervals along the Y direction (see FIG. 3D), for example. In the plate 62, liquid supply channels 68 are formed through which the liquid supply port 64 and the nozzle ports 60 communicate with each other to guide the sample. The liquid supply channels are separated by flow channel walls 70 and guide the sample at the liquid supply port 64 to the nozzle ports 60. Though not illustrated, electrical wirings, electrodes, and the like are formed in the substrate 58. Also, the plate 62 is made of a resin material, and the above components are formed by a photolithography technique. A water repellent layer 72 is formed on the surface of the plate 62 except the portions of the nozzle ports 60.

As described above, in the present embodiment, the head unit 14 functions as an ejection unit configured to eject the liquid by using the principle of inkjet ejection while also covering the opening portions of the wells W to thereby screen the internal spaces in the wells W from the external space.

<Control Configuration of Dispensing Apparatus>

Figure 4:
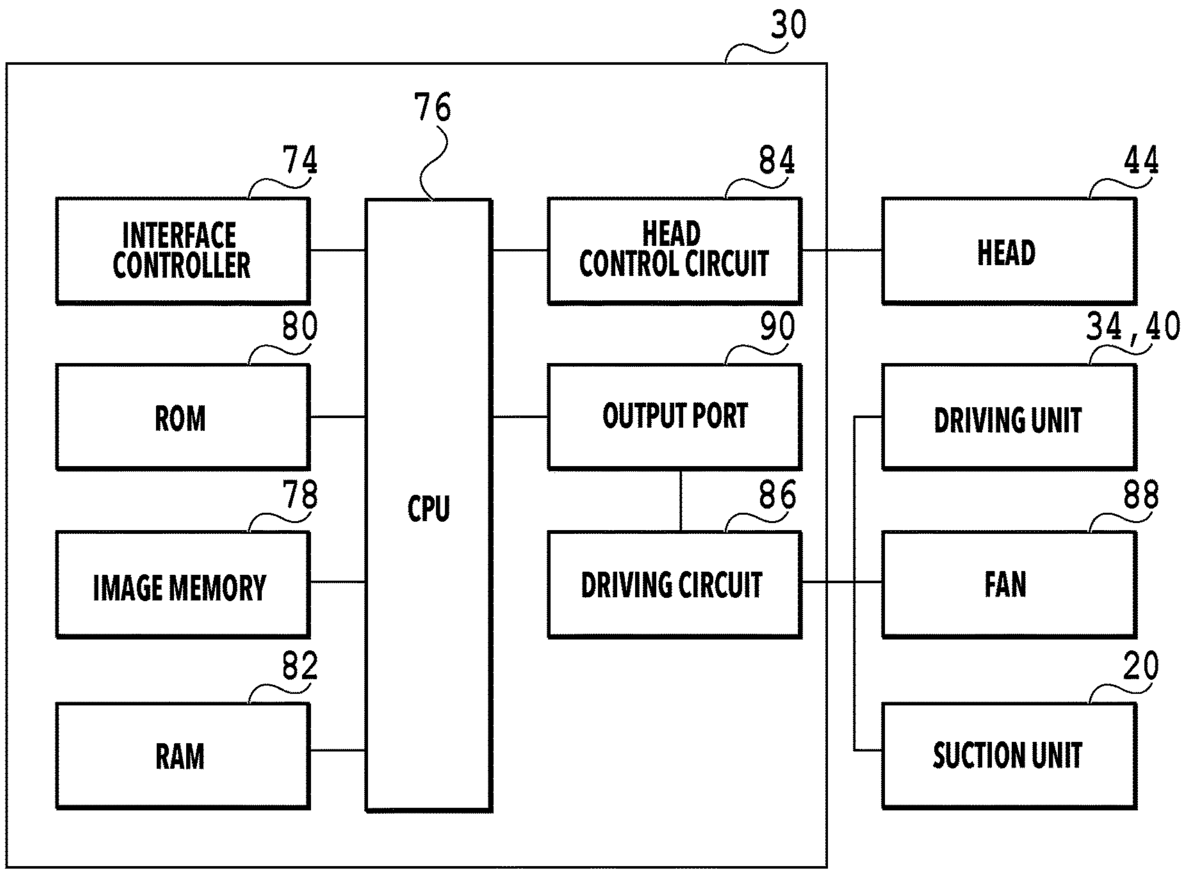
FIG. 4 is a block configuration diagram of a control system of the dispensing apparatus.

Next, a configuration of the control unit 30 will be described. FIG. 4 is a block configuration diagram of the control unit. The control unit 30 may be, for example, a general-purpose personal computer or a dedicated control device.

At the control unit 30, output data and commands output from the information terminal are input into a central processing unit (CPU) 76 via an interface controller 74. As the above information terminal, any of various publicly known terminals such as a general-purpose personal computer, a smartphone, or a tablet device can be used. This CPU 76 performs control of the entire dispensing apparatus 10 such as controlling the operations of component members of the apparatus. Moreover, the CPU 76 analyzes a command received, and then bitmaps image data to be used in dispensing and stores the bitmapped image data in an image memory 78. The image data to be used in dispensing is data for dispensing into each well W in the plate P, and is data indicating the position of each well in the plate P and the amount of the sample to be ejected into the well.

In the control unit 30, the CPU 76 is connected to a ROM 80 storing various programs, tables, and the like and a RAM 82 functioning as a work area and a temporary data storage area for the CPU 76. In the control unit 30, the CPU 76 is also connected to a head control circuit 84 for driving the head 44 and a driving circuit 86 that drives various driving units. The driving circuit 86 drives the driving units 34 and 40, the fan 88 provided at the air suction port 26, and the suction unit 20. Note that the CPU 76 is connected to the driving circuit 86 through an output port 90.

<Dispensing Process>

A description will be given of a case of performing a dispensing process of dispensing the sample into each well W in the plate P inside the dispensing apparatus 10 with the above configuration. To perform the dispensing process, the dispensing apparatus 10 is firstly set in a standby state, which is a state where the dispensing process can be started. Specifically, the user firstly disposes the plate P on the stage 12 and holds the head unit 14 filled with the sample to be dispensed on the holder 36. Next, the user positions the head unit 14 relative to the plate P disposed on the stage inside the dispensing apparatus 10. For this positioning, a publicly known technique can be employed. Also, the positioning process may be executed only at a predetermined timing.

Then, a process of filling the sample into the ejection part 48 of the head unit 14 is executed. Specifically, the head unit 14 is moved to a position where the suction unit 20 can suck the ejection part 48, and the suction unit 20 is driven to suck the sample from the ejection part 48, Specifically, via the driving circuit 86, the CPU 76 drives the driving units 34 and 40 to position the ejection part 48 directly above the suction unit 20, and then drives the driving unit not illustrated to lower the holder 36, thereby bringing the suction unit 20 into contact, with the ejection part 48. The CPU 76 then drives the suction unit 20 via the driving circuit 86 to cause the suction unit 20 to suck the sample from the ejection part 48.

Thereafter, the CPU 76 drives the fan 88 to create the standby state for the dispensing process. That is, the CPU 76 drives the fan 88 via the driving circuit 86. As a result, external air is sucked into the apparatus from the air suction port 26 and, by this suction, air inside the apparatus is discharged from the air discharge port 28. In this way, dust inside the dispensing apparatus 10 and aerosol such as mist generated during the dispensing process can be pushed out from the inside, and the aerosol inside can therefore be reduced.

Figure 5:
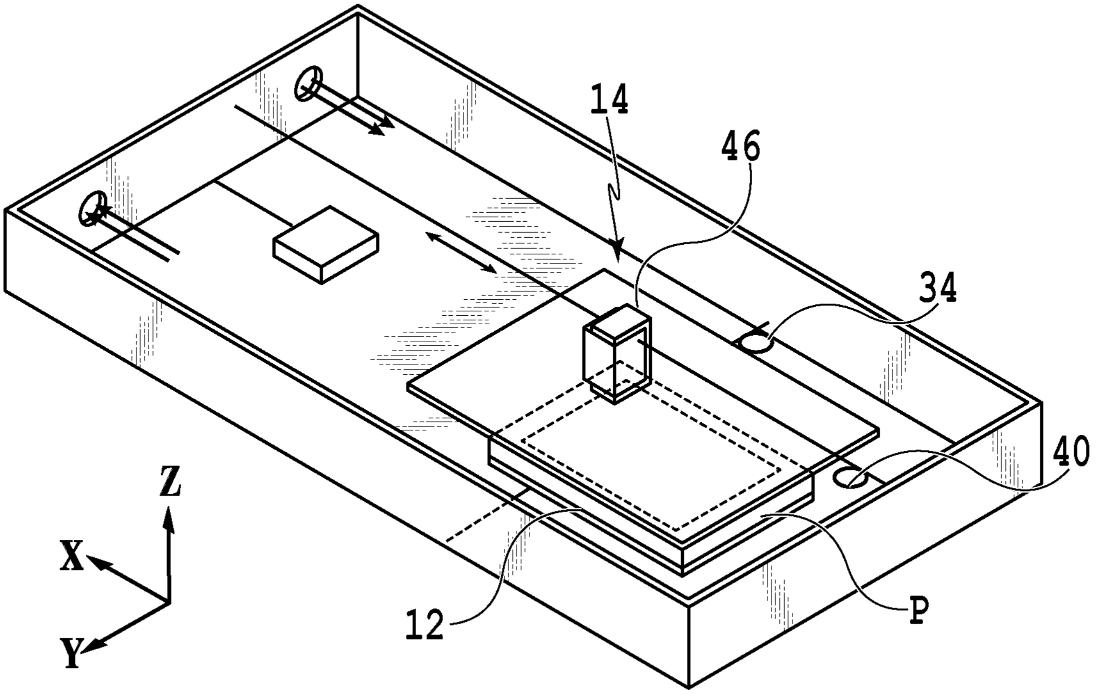
FIG. 5 is a diagram explaining an ejection start position.

After the dispensing apparatus 10 is thus set in the standby state, an instruction to start the dispensing is input along with various pieces of data including image data. As a result, the control unit 30 starts the dispensing process. Specifically, firstly, the image data is bitmapped and the bitmapped image data is stored in the image memory 78. Also, the stage 12 and the head unit 14 are moved to an ejection start position, Specifically, the CPU 76 drives the driving units 34 and 40 via the driving circuit 86 to move the stage 12 and the head unit 14 to an ejection start position at which the X coordinate value is largest and the Y coordinate value is smallest, for example, as illustrated in FIG. 5.

Next, the head unit 14 is lowered such that the gap between the head unit 14 and the plate P can be a preset value. The gap between the head unit 14 and the plate P refers to the distance between the sample ejection surface 48*a* of the ejection part 48 (or the back surface 46*a* of the screen 46 substantially coplanar with the ejection surface 48*a*) and an upper surface Pu of the plate P. The preset value is set to be a predetermined value of 0.1 mm or more and 1.0 mm or less. Note that the smaller this preset value, the shorter the distance between the screen 46 of the head unit 14 and the plate P. Thus, aerosol and the like floating inside the dispensing apparatus 10 are kept from entering the wells W during the dispensing process. Moreover, mist generated at the time of ejecting the sample from the ejection part 48 is kept from spreading inside the dispensing apparatus 10.

Thereafter, based on the processed data stored in the image memory 78, an operation of moving the stage 12 and the head unit 14 and an operation of ejecting the sample from the head unit 14 are alternately repeated to thereby eject the sample into all wells W in the plate P. The moving operation refers to an operation of moving the stage 12 and the head unit 14 to move the ejection part 48 to directly above a well into which the sample is to be ejected. The ejecting operation refers to an operation of ejecting a predetermined amount of the sample into the ejection-target well W.

After the end of the dispensing process, the dispensing apparatus 10 causes the control unit 30 to start counting time. Specifically, the CPU 76 starts counting time with a counter (not illustrated) and starts monitoring its count value. In this way, the time elapsed since the last-executed dispensing process can be obtained. When the time elapsed since the last dispensing process exceeds a predetermined time, the control unit 30 uses the suction unit 20 to suck the sample from the ejection part 48, so that the sample ejection condition at the ejection part 48 is maintained well or recovered. Note that the suction unit 20 may, for example, be configured to be capable of capping and thus protecting the ejection part 48, and the ejection part 48 may be capped with the suction unit 20 after each dispensing process.

As described above, the dispensing apparatus 10 includes the head unit 14 including the head 44, which ejects the sample based on the principle of inkjet ejection, and the screen 46, which can cover the opening portions of all wells W during a dispensing operation. The head unit 14 is such that the sample ejection surface 48*a* of the ejection part 48 in the head 44 is positioned to be substantially coplanar with the back surface 46*a* of the screen 46. Moreover, the gap between the upper surface Pu of the plate P including the wells W and the ejection surface 48*a* is 0.1 mm or more and 1.0 mm or less during the dispensing operation. In this way, in the dispensing apparatus 10, aerosol floating therein is kept from entering the wells W during the dispensing operation. Moreover, mist generated at the time of ejecting the sample from the ejection part 48 is kept from spreading inside the dispensing apparatus 10.

Also, in the dispensing apparatus 10, the head unit 14 is configured to be replaceable. Thus, by using a sterilized head unit 14 and plate P, it is possible to inhibit contamination during the dispensing operation. Further, mist generated at the time of ejecting the sample is kept from spreading by the screen 46, and the head unit 14 including the screen 46, to which this mist may be attached, is replaceable. This makes it possible to lower the frequency of cleaning the inside of the apparatus by the user and also inhibit contamination of the ejected sample. Note that any of various publicly known techniques can be used to sterilize the head unit 14.

Second Embodiment

Next, a liquid ejection apparatus according to a second embodiment will be described with reference to FIGS. 6A to 8B. Note that, in the following description, for identical or corresponding components to those in the liquid ejection apparatus according to the above first embodiment, specific description thereof will be omitted by using the same reference signs as those used in the first embodiment.

The second embodiment differs from the above first embodiment in that the liquid ejection apparatus is a compound introduction apparatus that introduces a compound into cells by using the principle of inkjet ejection. That is, the liquid ejection apparatus according to the present embodiment is a compound introduction apparatus that ejects a cell suspension (also called "cell-containing liquid") containing a compound and cells into which this compound is to be introduced with use of the principle of inkjet ejection to thereby introduce the compound into the cells. In the following description, the compound to be introduced into cells will also be referred to as "introduction-target compound" as appropriate.

<Configuration of Compound Introduction Apparatus>

Figure 6A:
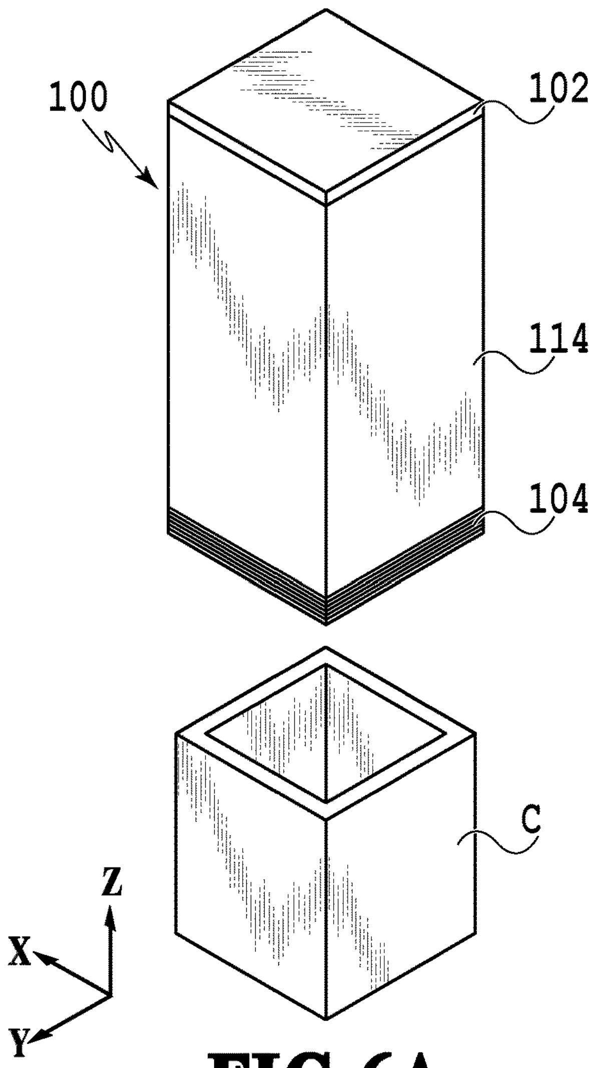
FIGS. 6A to 6C are schematic configuration diagrams of a compound introduction apparatus.
Figure 6B:
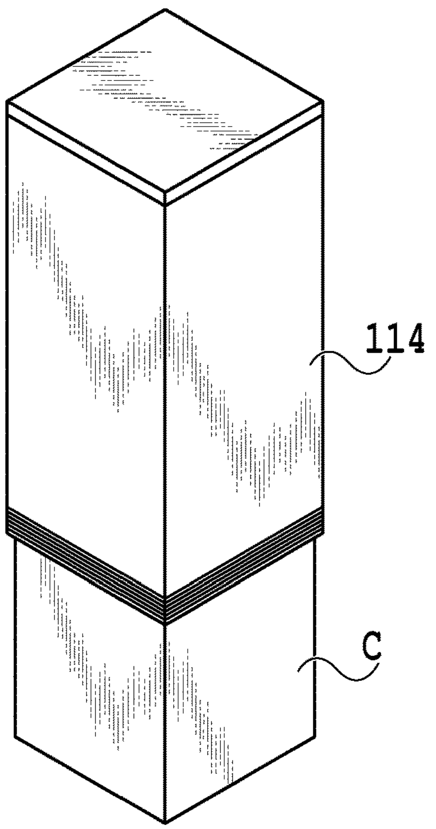
Figure 6C:
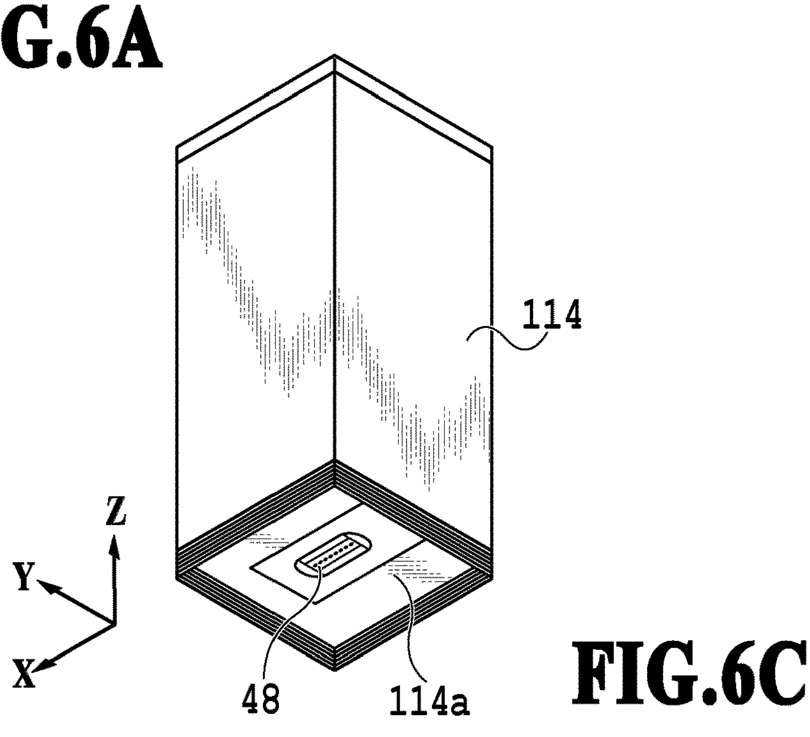
Figure 7:
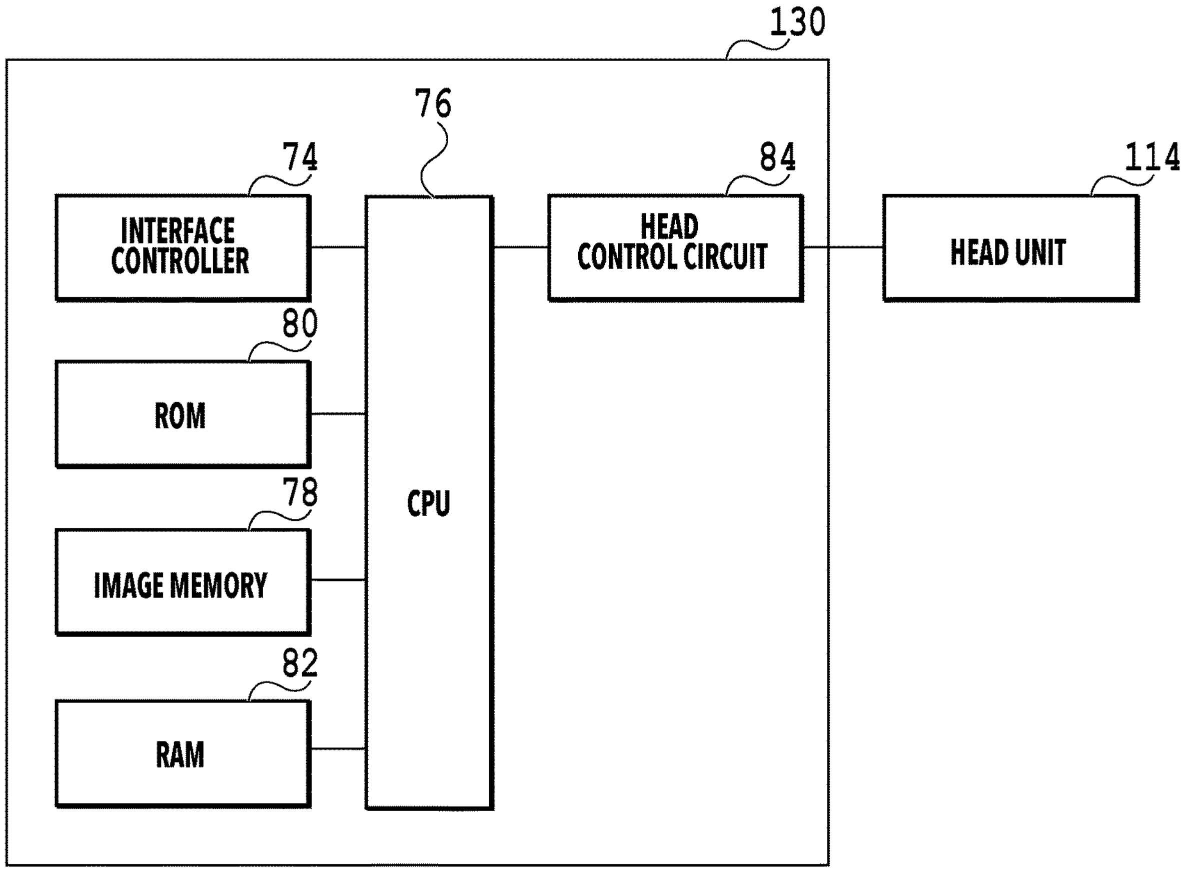
FIG. 7 is a block configuration diagram of a control system of the compound introduction apparatus.
Figure 8A:
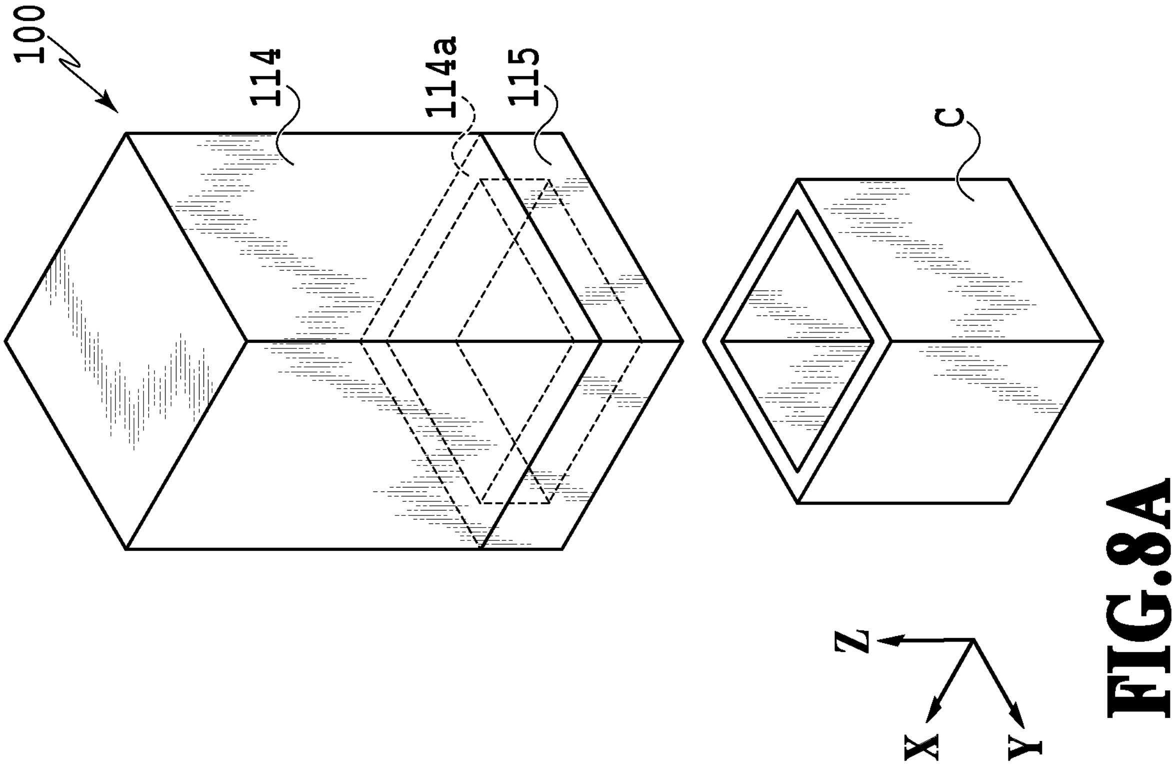
FIGS. 8A and 8B are diagrams illustrating a modification of the compound introduction apparatus.
Figure 8B:
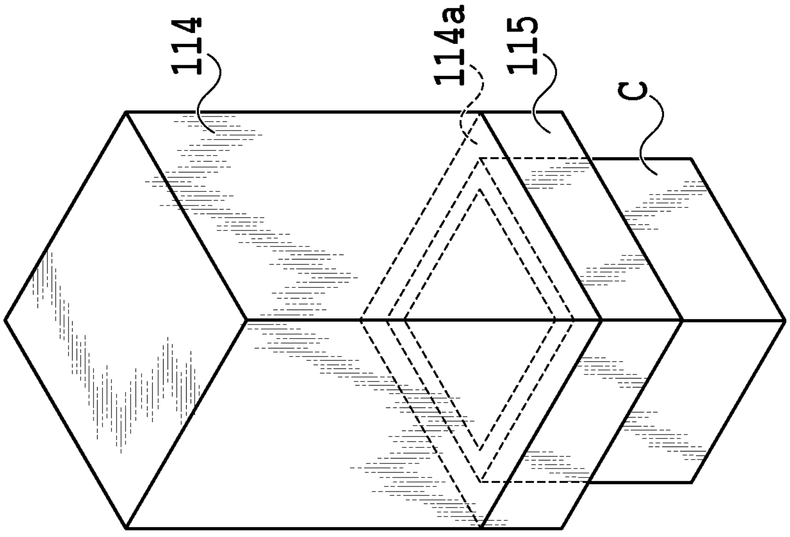

FIGS. 6A to 6C are schematic configuration diagrams of the compound introduction apparatus. FIG. 6A is a top perspective view of the compound introduction apparatus and a cuvette separated from each other. FIG. 6B is a top perspective view of the compound introduction apparatus attached to the cuvette. FIG. 6C is a bottom perspective view of the compound introduction apparatus. FIG. 7 is a block configuration diagram of a control unit.

A compound introduction apparatus 100 includes a head unit 114 that ejects a cell suspension into a cuvette C, which is a container including a storage part capable of storing a liquid (see FIG. 6A). The cell suspension is a liquid containing an introduction-target compound and cells into which this introduction-target compound is to be introduced. The head unit 114 includes a reservoir part (not illustrated) in which the cell suspension can be filled. To fill the cell suspension into the head unit 114, a lid part 102 provided at the top of the head unit 114 is detached, and the cell suspension is then filled into the reservoir part provided inside.

At a bottom surface 114*a* of the head unit 114, there is provided an ejection part 48 for ejecting the cell suspension held in the reservoir part (see FIG. 6C). The head unit 114 ejects the cell suspension from a plurality of nozzle ports 60 in the ejection part 48 by using a thermal inkjet method. In the present embodiment, the head unit 114 instantaneously applies at least mechanical energy to the filled cell suspension by means of ejection energy generation elements to not only eject the cell suspension from the ejection part but also introduce the introduction-target compound into cells.

Also, the head unit 114 includes a tight contact portion 104 to be brought into tight contact with the cuvette C to be attached to the head unit 114, at a position near the outer periphery of the bottom surface 114*a* or a position surrounding the bottom surface 114*a* (see FIG. 6C). By being in tight contact with the cuvette C, the tight contact portion 104 can screen the internal space in the cuvette C from the external space and thus tightly close the internal space (see FIG. 6B). Note that, in the state where the head unit 114 is attached to the cuvette C, the ejection part 48 is positioned inside the tightly closed space since it is provided at the bottom surface 114*a*. As the tight contact portion 104, an elastic material, such as rubber, may be used and a bellows shape may be employed, for example. As the constituent material and the shape of the tight contact portion 104, any material and shape may be selected as long as the tight contact portion 104 can tightly close the internal space in the cuvette C in an easy or effective manner. In a case where the compound introduction apparatus 100 introduces a different kind of cell suspension into a different cuvette C, the head unit 114 is replaced.

The operation of the entire compound introduction apparatus 100 is controlled by a control unit 130 illustrated in FIG. 7. An information terminal, such as a general-purpose personal computer, is connected to the compound introduction apparatus 100, and various instructions, information, and the like are input from this information terminal into the control unit 130 via interfaces. The control unit 130 may be, for example, a general-purpose personal computer or a dedicated control device.

At the control unit 130, output data and commands output from the information terminal are input into a CPU 76 via an interface controller 74 (see FIG. 7). This CPU 76 performs control of the entire compound introduction apparatus 100 such as controlling the operations of component members of the apparatus. The CPU 76 analyzes a command received, and then bitmaps image data to be used in ejecting a cell suspension and stores the bitmapped image data in an image memory 78. The image data to be used in ejecting the cell suspension is data for ejecting the cell suspension into the cuvette C and is, for example, data indicating the amount of the cell suspension to be ejected.

In the control unit 130, the CPU 76 is connected to a ROM 80 storing various programs, tables, and the like and a RAM 82 functioning as a work area and a temporary data storage area for the CPU 76. In the control unit 130, the CPU 76 is also connected to a head control circuit 84 for driving a head 44.

<Method of Sterilizing Head Unit>

One example of a method of sterilizing the head unit 114 will be described. In the present embodiment, the lid part 102 of the head unit 114 is detached, and washing is performed with a plenty of sterile water. Further, in a biological clean bench, the inside (such as the reservoir part) and outside of the head unit 114 are cleaned and sterilized using an aqueous solution containing 70% ethanol. Next, an excess portion of the ethanol aqueous solution is removed, and the inside and outside of the head unit 114 are washed using 15 mL of a 1× phosphate-buffered saline (1×PBS) (manufactured by Thermo Fisher Scientific K.K., pH=7.4). Thereafter, 5 mL of 1×PBS is additionally introduced into the reservoir part of the head unit 114 and, in this state, the 1×PBS held in the reservoir part is sucked out from the ejection part 48 of the head unit 114 by using an external aspirator connected to a sterilized tube. This series of processes are then repeated three times to sterilize the head unit 114.

<Method of Preparing Cell Suspension>

A method of preparing the cell suspension to be ejected from the compound introduction apparatus 100 will be described. The cell suspension to be used in the introduction process to be described later contains at least one introduction-target compound and one or more cells into which the introduction-target compound is to be introduced. This cell suspension contains water as its main component. Further, in the present invention, the cell suspension is a liquid in which cells are dispsersed. The cells in the cell suspension have only to be in a state in which the cells can be dispersed in the liquid by agitating, and may be precipitated in the liquid in a case where the cell suspension is kept in a stationary state.

A DNA solution containing a DNA as the introduction-target compound (a DNA having a fluorescent protein gene) is prepared in the following constitution.

First, 0.2 mL of 0.5 mol/L-EDTA Solution(pH 8.0) (manufactured by NACALAI TESQUE, INC.) and 1 mL of 1 mol/L-Tris-HCl Buffer Solution(pH 8.0) (manufactured by NACALAI TESQUE, INC.) are mixed with 98.8 mL of sterilized pure water. As a result, a FE buffer (10 mL Tris 1 mL EDTA. (pH8.0)) is prepared. Next, freeze-dried CMV- Fresno RFP (manufactured by ATUM, the number of base pairs=5.5 kbp) and the prepared TE buffer are mixed and agitated in a microtube, and the DNA is dissolved in that mixture. As a result, a DNA solution is obtained.

Part of the obtained DNA solution is further diluted with the TE buffer and then filled into a quartz cell. Thereafter, with a DNA concentration measurement apparatus (Gene Quant 1300, manufactured by Biochrom), concentration identification is performed to thereby figure out the concentration of the DNA solution. The inventor of the present application measured the concentration of the DNA solution obtained through the above procedure, and the value was 2.0 μg/μL.

The DNA solution thus obtained is used to prepare a cell suspension.

First RAW 264.7, which is a cell line established from murine monocytic leukemia, is dispersed in 20 mL of a Dulbecco's Modified Eagle Medium (D-MEM) culture medium so as to increase to 2000000 cells/mL. As the RAW 264.7, one purchased from the American Type Culture Collection is used. The D-MEM culture medium contains 10% fetal bovine serum (FBS) and 1% penicillin-streptomycin. The D-MEM culture medium also contains 1% Minimum Essential Medium-Eagle, Earle's Salts Base, with Non-Essential Amino Acid (MEM-NEAA).

As the 10% FBS, one manufactured by Global Life Science Technologies Japan K. K, is used. As the 1% penicillin-streptomycin, one manufactured by Sigma-Aldrich Co. LLC, is used. As the 1% MEM-NEAA and the D-MEM culture medium, ones manufactured by Thermo Fisher Scientific K.K. are used. Thereafter, by using the D-MEM culture medium with the RAW 264.7 dispersed therein, sets of approximately 1000000 cells (RAW 264.7) are seeded on a 100-nm polystyrene dish (manufactured by Corning Incorporated).

Next, the dish having the D-MEM culture medium with the seeded cells is placed in an environment of 37° C. and 5% carbon dioxide to culture and amplify the cells in the dish. After a state where the cells cover approximately 70% of the bottom surface of the dish is reached (about two to four days after the start of the culture), the supernatant culture medium is removed, and the cultured cells are rinsed with PBS. Then, the cultured cells are detached from the dish by using PBS containing 0.25% trypsin and 1 mM EDTA (manufactured by Thermo Fisher Scientific K. K.). As a result, in the dish, a cell suspension containing the detached cells (RAQW 264.7) is generated.

The generated cell suspension is collected and introduced into a centrifuge tube. At this time, the D-MEM culture medium is added to adjust the total amount to 50 mL. Thereafter, the centrifuge tube in which the cell suspension has been introduced is set in a centrifuge (CF16RXII, manufactured by Hitachi Koki Co., Ltd.) and subjected to centrifugation for five minutes with a centrifugal force of 90 G with the temperature inside the apparatus maintained at 4° C. Then, from the centrifuge tube in which the cells have settled, the supernatant is removed, and the D-MEM culture medium is added to thereby prepare a cell suspension containing this culture medium and the settled cells (cell pellet). Thereafter, the above-described culture is performed again using this cell suspension. In the cell suspension preparation, the above processes from the culture to the centrifugation process are executed three times.

Note that, in the third around, a number of cells necessary to achieve a desired cell concentration are taken into another separate centrifuge tube and centrifuged. Then, the supernatant in the centrifuge tube is removed, and a mixed liquid prepared by mixing equal amounts of the above-described DNA solution and Gene Pulser electroporation buffer (manufactured by Lonza K. K.) is added into the centrifuge tube from which the supernatant has been removed. Thereafter, inside this centrifuge tube, the mixed liquid and the settled cells are agitated with a micropipette, and the mixture is passed through a cell strainer (manufactured by Corning Incorporated, mesh size=40 μm), so that the cell suspension to be used in the later-described introduction process is obtained. Passing the mixture through the cell strainer can remove large cell aggregates from the cell suspension to be used in the introduction process.

<Introduction-Target Compound to Be Introduced into Cells>

In the present embodiment, the introduction-target compound to be introduced into cells is DNA, but is not limited to DNA and may be selected as appropriate according to its purpose. Examples of the introduction-target compound include nucleic acids, proteins, labeling substances, and the like. Introduction-target compounds employable in the present embodiment are not limited the above compounds, and any of various publicly known compounds can be used as long as the introduction-target compound is of such a size as to be containable within a cell into which it is to be introduced. Note that, in order to reduce damage to the cells, the size of the introduction-target compound is preferably ⅕ of the average diameter of the cells or smaller, and more preferably 1⁄10 of the average diameter of the cells or smaller.

<Cells into Which Introduction-Target Compound is to be Introduced>

In the present embodiment, as the cells, it is possible to use any of various publicly known cells into which compounds are introducible, such as adherent cells, suspension cells, spheroids (aggregate cells), microbial cells, and plant cells. The average diameter of the cells is such that a cell can be ejected from a nozzle port 60 and is, for example, 1 μm or more and 100 μm or less.

<Medium of Cell Suspension>

As the medium of the cell suspension, water or a water-soluble medium made of a mixture of water and a water-soluble organic solvent can be used, for example. The cell suspension can be obtained by adding cells and the introduction-target compound to the water-soluble medium, as described above. Note that the medium of the cell suspension is not limited to the above water-soluble medium, and various publicly known media are usable.

Media usable as the above medium are not particularly limited, and a buffer solution such as water, saline, PBS, or Tris is usable, for example. Also, as the above medium, a culture medium for cell culture, a commercially available buffer for electroporation, a commercially available buffer for FACS analysis, or the like, or an infusion solution such as lactated Ringer's solution is usable. As the culture medium for cell culture, the following are usable, for example. Iscove's Modified Dulbecco's Medium (IMDM). Hanks' Balanced Salt Solutions (HBSS) Roswell Park Memorial Institute Medium (RPMI) 1640 Also, as the culture medium for cell culture, the above-mentioned D-MEM, MEM-NEAA, and the like are usable.

It is particularly preferable that the above solvents contain 50% water or more. Also, two or more of the above solvents can be mixed and used. The water used as the medium of the cell suspension is preferably water deionized by ion exchange or the like and sterilized by heating with an autoclave or the like. The content of water in the cell suspension medium is preferably 30% by mass or more and 99% by mass or less relative to the mass of the cell suspension.

<Compound Introduction Process>

A description will be given of a case of performing an introduction process in which the compound introduction apparatus 100 with the above-described configuration introduces a compound into target cells by using the cell suspension prepared by the above-described preparation method. To perform the introduction process, the compound introduction apparatus 100 is firstly set in a state where the introduction process can be started. Specifically, firstly, the lid part 102 of the head unit 114 is detached, and 200 μL of the cell suspension to be used in the introduction process is introduced into the reservoir part of the head unit 114 with a micropipetter. Thereafter, a sterilized tube connected to an external aspirator is brought into contact with a predetermined region of the bottom surface 114*a* including the ejection part 48, and this predetermined region is sucked using the external aspirator. As a result, a given amount of the cell suspension held in the reservoir part is sucked from the ejection part 48 and filled into each nozzle port 60 in the ejection part 48.

Then, a culture medium is introduced into the cuvette C in a predetermined amount (such an amount as to wet the bottom surface, and this cuvette C is attached to the head unit 114. As a result, the internal space in the cuvette C is screened from the external space and tightly closed by the bottom surface 114*a* and the tight contact portion 104. Moreover, the ejection part 48 formed at the bottom surface 114*a* is positioned inside this tightly closed space.

After the compound introduction apparatus 100 is thus set in the state where the introduction process can be started, an instruction to start the introduction process is input along with image data. In response to this, the image data is processed first. Then, based on the processed data, the cell suspension is ejected from the ejection part 48 into the cuvette C to thereby the introduction-target compound in the cell suspension into cells. In the present embodiment, based on the processed data, an ejection operation of ejecting the cell suspension from all nozzle ports 60 formed in the ejection part 48 at a duty of 100% within a 1.5 cm×1.5 cm region, for example. In the present embodiment, a duty, of 100% is defined as application of a single 23.0 ng droplet to a 1/600 inch×1/600 inch unit region at a resolution of 600 dpi×600 dpi.

In the ejection of the cell suspension from the head unit 114, the ejection energy generation elements are driven, so that the introduction-target compound in the cell suspension is introduced into cells, and the cell suspension containing the cells into which the introduction-target compound has been introduced is ejected from the nozzle ports 60.

Thereafter, the cuvette C, serving as a container capable of storing the ejected cell suspension, is detached from the compound introduction apparatus 100, and the above-described D-MEM culture medium is introduced into the cuvette C. This cuvette C is then placed in an environment of 37° C. and 5% carbon dioxide to culture and amplify the cells in the cuvette C.

The introduction rate of the introduction-target compound into cells can be calculated through the following procedure, for example.

Firstly, the cells contained in the ejected cell suspension are cultured for one day inside the cuvette C, and then the D-MEM culture medium is removed and the cultured cells are rinsed with 1×PBS. Thereafter, 2 ml of 1×PBS is added and the culture medium is replaced, followed by observation using a fluorescence microscope (manufactured by Keyence Corporation, model number: BZ-8000) with a 10× object lens in a bright-field mode and a fluorescence mode (TRITC: excitation=540±12.5 nm, fluorescence=605±27.5 nm, cut=565 nm). In this observation, the number of fluorescence-emitting cells and the number of all cells are counted. Then, by using these count values, whether a fluorescent protein has been expressed in the cells as a result of introducing the introduction-target compound (in the present embodiment, DNA) is evaluated. Specifically, a value calculated by dividing the number of fluorescence-emitting cells by the number of all cells and multiplying the quotient by 100 is defined as the introduction rate of the introduction-target compound. The introduction process was performed through the above procedure, and the introduction rate of the introduction-target compound was 5% or more.

As described above, the compound introduction apparatus 100 includes the head unit 114 capable of ejecting a cell suspension based on the principle of inkjet ejection while also tightly closing the internal space in the cuvette C, into which the cell suspension is ejected. Also, the head unit 114 is replaced in a case of ejecting a different cell suspension into a new cuvette C.

In this way, it is possible to screen the internal space in the cuvette C from the external space and thus tightly close the internal space while also keeping aerosol originating from another cell suspension or the like from entering the internal space. Accordingly, it is possible to inhibit contamination of the ejected cell suspension.

Other Embodiments

Note that the above embodiments may be modified as described in (1) to (7) below.

(1) Though not particularly described in the above first embodiment, the configuration may be such that, for example, a plurality of types of samples differing in the concentration of a predetermined substance can be filled in the head 44, and nozzle arrays capable of ejecting the respective types of samples are formed in the ejection part 48. In this way, the dispensing apparatus 10 can fill the different types of samples into a single plate P without replacing the head unit 14.

(2) In the above first embodiment, a predetermined amount of a sample is dispensed into each well W, but the first embodiment is not limited to this method. The image data may be adjusted such that the amount to be ejected will be different for each group of a given number of wells W. Also, in the above embodiments, the heating elements 66 are used to eject a liquid from the nozzle ports 60, but the embodiments are not limited to this configuration. Various publicly known energy generation elements, such as piezoelectric elements, can be used. The dispensing apparatus 10 in the above first embodiment may be utilized as a compound introduction apparatus by filling the cell suspension used in the above second embodiment in the tank part 50.

(3) In the above first embodiment, the head unit 14 and the stage 12, on which to disposed the plate P, are configured to be movable relative to each other in the X and Y directions, but the first embodiment is not limited to this configuration. Specifically, the configuration may be such that the nozzle arrays as the nozzle ports 60 formed in the ejection part 48 of the head 44 are formed to extend in the Y direction across the region of the plate P where the wells W are formed, and one of the head unit 14 or the plate P is moved in the X direction. In this case, for each row of wells W arrayed in the Y direction in the plate P, the liquid is ejected from the corresponding nozzle ports 60 positioned above the wells W based on the image data. Such a configuration can shorten the time required to complete a dispensing process per plate P.

(4) In the above second embodiment, the cuvette C is attached to the bottom surface 114*a* of the head unit 114 via the tight contact portion 104. However, how the cuvette C is attached to the compound introduction apparatus 100 is not limited to this manner. Specifically, on the head unit 114 of the compound introduction apparatus 100, a frame portion 115 of such a shape that the cuvette C can be inserted into and pulled out of it may be formed at the periphery of the bottom surface 114*a*, at which the ejection part 48 is formed (see FIGS. 8A and 8B). In this case, the cuvette C is attached to the head unit 114 by inserting the cuvette C into the frame portion 115. Doing so can tightly close the internal space in the cuvette C. The frame portion 115 may be fixedly provided on the bottom surface 114*a* of the head unit 114 with the connection therebetween completely sealed, or provided integrally with the bottom surface 114*a*.

(5) In the above second embodiment, the ejection part 48 is fixedly arranged in the head unit 114, but the second embodiment is not limited to this configuration. Specifically, a predetermined component including the ejection part 48 may be configured to be movable in the front-rear direction and the left-right direction (±Y direction and ±X direction) in the head unit 114. The predetermined component may also be configured to be capable of being raised and lowered (in the +Z direction). In this way, the liquid (cell suspension) can be ejected to a predetermined region(s) in the container into which the liquid is to be ejected. Specifically, in a case where the inside of the container is partitioned and divided, the liquid can be ejected into each of the divided regions, for example.

(6) In the above second embodiment, the tight contact portion 104 is formed in a rectangular shape according to the shape of the cuvette C, which has a prism shape, but the second embodiment is not limited to this configuration. That is, the tight contact portion 104 may be formed according to the shape of a container into which the liquid is to be ejected.

(7) The various configurations described in the above embodiments and (1) to (6) may be combined as appropriate.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2021-044708 filed Mar. 18, 2021, and No. 2022-037162 filed Mar. 10, 2022, which are hereby incorporated by reference wherein in their entirety.

What is claimed is:

1. A liquid ejection apparatus comprising:

an ejection unit having an ejection part, a screen, and an ejection energy generation element that ejects a liquid from the ejection part by using a principle of inkjet ejection into an internal space in a storage part capable of storing the ejected liquid;

a stage on which to dispose a container including a plurality of storage parts; and a movement unit capable of moving the stage and the ejection unit relative to each other to move the ejection unit to a position at which the ejection unit ejects the liquid to the storage part of the container disposed on the stage, wherein when the ejecting unit ejects the liquid to each of the storage parts, the screen covers opening portions of all of the storage parts to thereby screen internal spaces in all of the storage parts from an external space in such a state that the liquid is ejectable to the storage part to which the liquid is to be ejected.

2. The liquid ejection apparatus according to claim 1, wherein the screen has a plate shape.

3. The liquid ejection apparatus according to claim 2, wherein an ejection surface of the ejection unit from which to eject the liquid and a surface of the screen which faces the container are positioned to be substantially coplanar with each other.

4. The liquid ejection apparatus according to claim 3, wherein a distance between the ejection surface and the container when the liquid is ejected from the ejection unit to the storage parts is 0.1 mm to 1.0 mm.

5. The liquid ejection apparatus according to claim 1, wherein the ejection unit, the stage, and the movement unit are disposed inside a housing, and wherein, in the housing, an air suction port through which to suck air to the inside of the housing and an air discharge port through which to discharge air to an outside of the housing are formed.

6. The liquid ejection apparatus according to claim 5, wherein the air suction port includes a suction mechanism that sucks air outside the housing to the inside of the housing through a filter by driving a fan.

7. The liquid ejection apparatus according to claim 1, wherein the ejection unit is filled with the liquid to be ejected and is configured to be replaceable.

8. The liquid ejection apparatus according to claim 1, wherein the liquid is a cell suspension containing a compound and a cell into which the compound is to be introduced.

9. A liquid ejection method using for a liquid ejection apparatus including:

an ejection unit having an ejection part, a screen, and an ejection energy generation element that ejects a liquid from the ejection part by using a principle of inkjet ejection into an internal space in a storage part capable of storing the ejected liquid;

a stage on which to dispose a container including a plurality of storage parts; and a movement unit capable of moving the stage and the ejection unit relative to each other to move the ejection unit to a position at which the ejection unit ejects the liquid to the storage part of the container disposed on the stage, the method comprising:

when the ejecting unit ejects the liquid to each of the storage parts, covering with the screen opening portions of all of the storage parts to thereby screen internal spaces in all of the storage parts from an external space in such a state that the liquid is ejectable to the storage part to which the liquid is to be ejected.

10. A dispensing apparatus comprising:

a stage on which to dispose a container including a plurality of storage parts capable of storing a liquid;

an ejection unit configured to be replaceable, filled with the liquid, and having an ejection part, a screen, and an ejection energy generation element that ejects the liquid from the ejection part by using a principle of inkjet ejection; and a movement unit configured to move the stage and the ejection unit relative to each other to move the ejection unit to a position at which the ejection unit ejects the liquid to the storage part of the container disposed on the stage, wherein the liquid is dispensed into each of the storage parts by ejecting the liquid into an internal space in the storage part from the ejection unit moved to an opening portion of the storage part by the movement unit, and wherein when the ejection unit ejects the liquid to each of the storage parts, the screen covers opening portions of all of the storage parts to thereby screen internal spaces in all of the storage parts from an external space in such a state that the liquid is ejectable to the storage part to which the liquid is to be ejected.

* * * * *